United States Patent
Schubert et al.

(10) Patent No.: US 11,945,520 B2
(45) Date of Patent: Apr. 2, 2024

(54) STEERING SYSTEM

(71) Applicant: Robert Bosch GmbH, Stuttgart (DE)

(72) Inventors: Frederik Schubert, Schwaebisch Gmuend (DE); Thomas Poetzl, Winnenden (DE)

(73) Assignee: Robert Bosch GmbH, Stuttgart (DE)

( * ) Notice: Subject to any disclaimer, the term of this patent is extended or adjusted under 35 U.S.C. 154(b) by 336 days.

(21) Appl. No.: 17/327,191

(22) Filed: May 21, 2021

(65) Prior Publication Data

US 2021/0362773 A1   Nov. 25, 2021

(30) Foreign Application Priority Data

May 25, 2020   (DE) ...................... 10 2020 206 428.8

(51) Int. Cl.
*B62D 5/04*  (2006.01)
(52) U.S. Cl.
CPC ......... *B62D 5/0448* (2013.01); *B62D 5/0403* (2013.01); *B62D 5/0424* (2013.01)
(58) Field of Classification Search
CPC . F16H 55/52; F16H 2025/249; B62D 5/0448; B62D 5/0403; B62D 5/0424; B62D 3/06; B62D 3/08
See application file for complete search history.

(56) References Cited

U.S. PATENT DOCUMENTS

| 8,307,940 B2 * | 11/2012 | Bugosh | F16C 27/066 |
| | | | 180/443 |
| 9,809,245 B2 * | 11/2017 | László | B62D 5/0448 |
| 2004/0099472 A1 * | 5/2004 | Johnson | F16H 25/24 |
| | | | 180/444 |

FOREIGN PATENT DOCUMENTS

| DE | 10 2015 104 925 A1 | 10/2016 | |
| DE | 10 2019 201 933 A1 | 8/2020 | |
| ES | 2640251 T3 * | 11/2017 | ........... B62D 5/0424 |
| JP | 3693601 B2 * | 9/2005 | ........... B62D 5/0427 |
| WO | WO-2018068932 A1 * | 4/2018 | |
| WO | WO-2018068933 A1 * | 4/2018 | |
| WO | WO-2020164774 A1 * | 8/2020 | ........... B62D 5/0424 |

* cited by examiner

*Primary Examiner* — Bobby Rushing, Jr.
(74) *Attorney, Agent, or Firm* — Maginot, Moore & Beck LLP

(57) ABSTRACT

A steering system has a steering rod longitudinally displaceable in a housing and a steering motor acting on the steering rod via a ball screw drive. The steering rod has a recirculating ball thread interacting via spherical transmission elements with a transmission nut driven by the steering motor and that is rotatably mounted by a bearing arrangement with a pivot bearing having an inner ring to which a mechanism wheel is fixedly attached. The transmission nut is pivotably mounted on the mechanism wheel about a pivot axis oriented perpendicularly to the longitudinal axis of the steering rod, and has a curved joint section which interacts with a curved joint section of the mechanism wheel to form a pivoting bearing. In order to realize low-friction movement capability of the pivoting bearing, at least one of the joint sections has a sliding coating, and/or a lubricant is arranged between the joint sections.

12 Claims, 2 Drawing Sheets

STEERING SYSTEM

This application claims priority under 35 U.S.C. § 119 to application no. DE 10 2020 206 428.8, filed on May 25, 2020 in Germany, the disclosure of which is incorporated herein by reference in its entirety.

The disclosure relates to a steering system with a steering rod which is mounted in a housing such that it can be displaced in a longitudinally axial manner, and with a steering motor which acts on the steering rod via a ball screw drive, to which end the steering rod configures a recirculating ball thread in at least one section which interacts with a transmission nut which can be driven by the steering motor, the transmission nut being mounted by means of a bearing arrangement such that it can be rotated within the housing.

BACKGROUND

A steering system of this type is known from DE 10 2015 104 925 A1.

German patent publication DE 10 2019 201 933 A1 likewise describes a steering system of this type. Said steering system specifically comprises a steering rod which is mounted in a housing such that it can be displaced in a longitudinally axial manner, and a steering motor which acts on the steering rod via a ball screw drive, to which end the steering rod configures a recirculating ball thread which interacts via spherical transmission elements with a transmission nut which can be driven by the steering motor, the transmission nut being mounted by means of a bearing arrangement such that it can be rotated within the housing. Furthermore, a mechanism wheel of a flexible drive mechanism, via which mechanism wheel drive power of the steering motor can be transmitted to the transmission nut, is attached fixedly such that it cannot tilt to an inner ring of a pivot bearing of the bearing arrangement, the transmission nut being mounted on the mechanism wheel such that it can be pivoted about a pivot axis which is oriented perpendicularly with respect to the longitudinal axis of the steering rod. To this end, the transmission nut has a curved joint section which configures a pivoting bearing with a curved joint section of the mechanism wheel. A plain bearing layer can be arranged between the joint sections, by way of which a movement capability with as low a friction as possible of the pivoting bearing is to be realized. Here, the plain bearing layer is to be configured in the form of a separate component made from plastic. Furthermore, a movable first part section of the joint section of the mechanism wheel is pressed elastically by means of a prestressed loading apparatus in the direction of a second part section of the joint section of the mechanism wheel, as a result of which a largely play-free state of the pivoting bearing is set. Said loading apparatus comprises two ring elements which in each case have an end side which is configured at least in sections as an oblique face, the oblique faces of the two ring elements making contact with one another, and the ring elements being loaded by means of a plurality of prestressed spring elements in order to carry out a relative rotation.

A relatively great adjustment travel for the first part section of the joint section of the mechanism wheel can be realized by means of a loading apparatus of this type, with simultaneously relatively small dimensions in the axial direction of the loading apparatus. A relatively great adjustment travel of this type is required because the plain bearing layer which is configured as a separate component from plastic and is arranged between the joint sections of the mechanism wheel and the transmission nut is subject to a relatively great plastic deformation over the service life of the steering system as a consequence of settling of the plastic, which has to be compensated for to a corresponding extent by way of the loading apparatus. Accordingly, a disadvantage of a steering system of this type is the relatively great structural complexity which is associated, in particular, with the provision of the loading apparatus.

SUMMARY

The disclosure was based on the object of providing a steering system which is functionally advantageous and at the same time simple and inexpensive to produce.

Said object is achieved by means of a steering system as disclosed herein. Advantageous refinements of the steering system according to the disclosure result from the following description.

According to the disclosure, a steering system is provided which has at least one steering rod which is mounted in a housing such that it can be displaced in a longitudinally axial manner, and a steering motor, the steering motor acting on the steering rod via a ball screw drive, to which end the steering rod configures a recirculating ball thread in at least one section, which recirculating ball thread interacts via spherical transmission elements with a transmission nut which can be driven by the (preferably electric, possibly also hydraulic) steering motor. Here, the transmission nut is arranged within the housing such that it can be rotated by means of a bearing arrangement. Furthermore, a mechanism wheel of a flexible drive mechanism, for example of a toothed belt mechanism, via which mechanism wheel drive power of the steering motor can be transmitted to the transmission nut, is attached fixedly such that it cannot tilt and preferably also fixedly for conjoint rotation to an inner ring of a pivot bearing of the bearing arrangement which is preferably configured in the form of an anti-friction bearing. Here, "fixedly such that it cannot tilt" is understood to mean that tilting of the mechanism wheel about an arbitrary or about any tilting axis which lies perpendicularly with respect to its longitudinal axis is transmitted to the inner ring of the pivoting bearing. Furthermore, it is provided that the transmission nut is mounted on the mechanism wheel such that it can be pivoted about an (in particular, about any) pivot axis which is oriented perpendicularly with regard to the longitudinal axis of the steering rod.

It is provided to this end that the transmission nut has a curved, preferably partially spherically and/or convexly curved, joint section which interacts with a curved, preferably partially spherically and/or concavely curved, joint section which is configured at least partially, possibly completely, by the mechanism wheel for the configuration of a pivoting bearing. In order to realize the movement capability of the pivoting bearing which is as low in friction as possible, furthermore, it is provided that at least one of the joint sections is provided with a sliding coating, and/or a lubricant, in particular a pasty lubricant, for example a lubricating grease, is arranged between the joint sections. Here, a "sliding coating" is understood to mean a coating which is arranged fixedly on a surface of a main body of the mechanism wheel or of the transmission nut, which coating is configured from a material which differs from the material of the main body. Here, the material can be, in particular, a sliding material which, in combination with that material from which the mating contact face is configured, has a relatively low and, in particular, as low as possible a coefficient of friction. A sliding coating which is advantageous for the provided use can comprise, possibly mainly, polyoxymethylene (POM) and possibly additionally polytetrafluroethylene (PTFE).

The transmission nut and/or the mechanism wheel can preferably be configured completely, but at least in the regions which configure the curved joint sections, from metal, in particular from steel or aluminum, in order to ensure a load-bearing capability which is as high as possible.

On account of a configuration of this type of a steering gear, in the case of which configuration a pivoting bearing which ensures the pivoting capability of the transmission nut is configured on the mechanism wheel and not on the pivoting bearing itself, decoupling of a transmission nut, which is pivoted as a consequence of a corresponding bending load of the steering rod, from the pivoting bearing can be achieved, as a result of which a plurality of advantages can be realized. One of these advantages lies in an automatic elimination of play of the pivoting bearing, as a result of which undesired noise development can be avoided or reduced. This automatic elimination of play of the pivoting bearing is based on the tilt-proof attachment of the mechanism wheel to the inner ring of the pivoting bearing in conjunction with the decoupling, realized, furthermore, by way of the configuration according to the disclosure of the steering system, of the pivoting bearing from pivoting movements of the transmission nut, which decoupling is realized by way of the configuration of the pivoting bearing on the mechanism wheel. In this way, bearing play and, in particular, axial play of the pivoting bearing can namely be eliminated by way of the tensile loading of the flexible drive mechanism, which tensile loading acts on the mechanism wheel, by said tensile loading leading to slight tilting of the inner ring of the pivoting bearing, which tilting is decoupled from pivoting movements of the transmission nut.

Furthermore, as a consequence of the configuration according to the disclosure of a steering system, decoupling of the transmission nut from a tensile load of the mechanism wheel of the flexible drive mechanism can be realized, which has a positive effect with regard to frictional resistance which is as optimum as possible and, in particular, is also constant being achieved in the relative movements of the ball screw drive.

At the same time, despite these advantages which can be achieved, a steering system according to the disclosure can have a construction which is relatively simple in structural terms and is therefore also robust and inexpensive. Here, the sliding coating which can be provided for at least one of the joint sections and/or the lubricant which is arranged between the joint sections ensure/ensures a movement capability of the pivot joint with as low a friction as possible, without being accompanied by a relatively great settling behavior over the service life of the steering system, which would have to be compensated for if a freedom from play of the pivot joint as far as possible is to be ensured over the entire service life.

Therefore, in the case of a steering system according to the disclosure, a corresponding loading apparatus for adjusting the pivot joint in order to realize a freedom from play can be dispensed with, or a loading apparatus which is provided for this purpose can be of relatively simple configuration because merely relatively small adjustment travels have to be provided by means of it.

Accordingly, it can be provided in the case of a steering system according to the disclosure that the joint section of the transmission nut and/or the joint section of the mechanism wheel are/is loaded elastically in such a way that a play-free contact is set between the joint sections. The elastic loading of this type of the joint section of the transmission nut and/or of the joint section of the mechanism wheel can be realized in a structurally advantageous way by virtue of the fact that a second part section of the joint section of the transmission nut and/or a second part section of the joint section of the mechanism wheel (or a component of the steering system which configures the respective second part section) can be displaced relative to a (respective) associated first part section (or with respect to a component of the steering system which configures the respective first part section) axially with regard to the longitudinal axis of the steering rod, and are/is loaded by means of an elastically prestressed loading apparatus.

Here, the loading apparatus can preferably comprise at least one spring element which acts in the axial direction with regard to the mechanism wheel and the transmission nut (with regard to the respective longitudinal or rotational axis). A spring element of this type which itself brings about a prestressing force in the axial direction with regard to the internal gear and the transmission nut as a consequence of an elastic prestressing can be of simple and therefore inexpensive configuration, since it has to provide only minimum adjusting travels on account of the non-existent necessity of compensating for settling of a sliding layer which is configured as a separate component, in order to ensure as far as possible a freedom from play of the pivot joint.

A corresponding spring element can preferably be configured as a tapered ring or a corrugated spring ring or as a cup spring. A cup spring has the shape of the shell of a flat truncated cone. It can be compressed elastically between its edge circles and generates an axial restoring force as a result. Cup springs are standardized, for example, in DIN 2093. A corrugated spring is a spring which is configured from corrugated material, in particular flat wire. In the case of loading of the corrugated spring, the corrugations are flattened and an axial restoring force is generated as a result. A tapered ring is a C-shaped securing ring or groove ring, as are used (for example, in accordance with DIN 471 or DIN 472) for the axial positional securing in inner-side receiving grooves of openings or in outer-side receiving grooves of components with circular cross sections, said rings being deformed elastically for insertion. If a securing ring of this type has an end side which is oriented obliquely (that is to say, not perpendicularly) with regard to its longitudinal axis, and/or an end side of the securing ring interacts with a correspondingly oblique bounding face of the associated receiving groove, an elastic restoring movement of the previously deformed securing ring can be converted into an axial movement. As a consequence, a radial elastic prestress of a securing ring of this type which is configured or acts as a tapered ring at the same time brings about an axial prestress. One advantage of a tapered ring of this type lies in the fact that both positional securing for the component which configures the movable part section of the mechanism wheel or the transmission nut and the axial prestress of said component can be realized by means of this in combination with a corresponding receiving groove without additional components, and therefore the broad freedom from play of the pivot joint can be ensured. In the case of the use of a corrugated spring or cup spring, in contrast, an additional positional securing element can possibly be required, for example in the form of a simple securing ring which does not act or is not configured as a tapered ring, on which simple securing ring the corresponding spring element is supported.

It can be provided in accordance with one preferred embodiment of a steering system according to the disclosure that the mechanism wheel is configured as a mechanism internal gear, and the joint section of the transmission nut is arranged at least partially, possibly completely, within the mechanism wheel. As a result, in particular, an embodiment of the steering system can be realized, in the case of which embodiment the steering gear of the steering system, that is to say the unit of those components, by means of which drive power is transmitted from the steering motor to the steering rod, has a particularly compact configuration at least with regard to the extent along the longitudinal axis of the steering rod.

In order to realize a direct transmission of drive power of the steering motor from the mechanism gear which is part of the flexible drive mechanism to the transmission nut, it can be provided in accordance with one preferred refinement of a steering system according to the disclosure that the mechanism wheel is connected to the transmission nut by means of a coupling fixedly for conjoint rotation, that is to say in a torque-transmitting manner. Here, the coupling is configured in such a way that it ensures the pivoting capability of the pivoting joint despite the fixed connection for conjoint rotation.

A coupling which can advantageously meet these requirements has a toothing system of the mechanism wheel, preferably an internal toothing system (in particular, in the case of the preferred embodiment as a mechanism internal gear) and a toothing system, preferably an external toothing system of the transmission nut, which toothing systems interact in a manner in which they engage into one another, in order to transmit a torque. Here, the teeth of said toothing systems can preferably be oriented parallel to the longitudinal axis of the steering rod. Furthermore, the teeth can preferably have tooth tips which run in a curved manner and/or tooth flanks which are configured in a curved manner, with the result that the coupling can then be configured in the form of what is known as a curved tooth coupling. Since said toothing systems which engage into one another of the mechanism wheel and the transmission nut can be part of the pivoting joint, it can preferably be provided that at least one of said toothing systems is likewise provided (at least in sections) with a sliding coating and/or a lubricant is arranged between the toothing systems which engage into one another. As a result, a movement capability of the pivoting joint with as low a friction as possible can be ensured.

An integration of the clutch, which integration is advantageous, in particular, with regard to the dimensions but also with regard to the function, can be achieved by virtue of the fact that said clutch is arranged (preferably centrally) between a first part section and a second part section of the joint section of the transmission nut and/or the joint section of the mechanism wheel. In the case of a corresponding embodiment of the steering system, said part sections can preferably be those part sections which can be displaced relative to one another and are loaded by means of a prestressed loading apparatus.

Furthermore, it can be provided in accordance with one preferred embodiment of a steering system according to the disclosure that the transmission nut is arranged within the inner ring of the pivot bearing with a defined radial play (that is to say, at a defined spacing over the entire circumference of the transmission nut). Here, the radial play can preferably be selected to be so great that a contact between the transmission nut and the inner ring is avoided in the case of all oblique positions between said components which are to be expected and/or which occur during normal operation of the steering system. Here, the partial arrangement of the transmission nut within the pivot bearing makes a compact embodiment of the steering gear of the steering system possible with, at the same time, a relatively great length of the transmission nut, which in turn has an advantageous effect with regard to the magnitude of the drive power which can be transmitted via the ball screw drive. Here, despite this arrangement, the radial play ensures the decoupling of the pivot bearing from pivoting movements of the transmission nut.

The (preferably only) pivot bearing of the bearing arrangement of a steering system according to the disclosure can advantageously be a single-row ball bearing, in particular a four-point bearing (in accordance with DIN 628), which, despite its suitability for the transmission of relatively high axial forces, makes a relatively inexpensive configuration of the steering system possible.

The tilt-proof and preferably also fixed attachment of the mechanism wheel for conjoint rotation to the inner ring of the pivot bearing can be realized firstly by virtue of the fact that they are configured in one piece, that is to say they represent the same component. There is likewise the possibility that they are configured as separate components and are correspondingly connected to one another.

The steering system according to the disclosure can preferably be configured as a power steering system, and can therefore make it possible for a manually generated steering torque which is transmitted via a steering handle (for example, a steering wheel) and preferably with the interposition of a steering column to a steering gear to be superimposed with a steering torque which is generated by the steering motor, in order to reduce the magnitude of the steering torque which is required for steering and is to be generated manually (possibly temporarily also as far as zero). Here, the steering gear can comprise, in particular, a steering pinion which interacts with a toothing system which is configured by the steering rod in one section. Secondly, the steering system can also be configured in such a way that the steering motor always provides the entire drive power which is required for steering.

The disclosure also relates to a motor vehicle, in particular a wheel-based and not rail-bound motor vehicle, preferably a passenger motor car or a truck, with a steering system according to the disclosure.

BRIEF DESCRIPTION OF THE DRAWINGS

The disclosure will be described in greater detail in the following text on the basis of one exemplary embodiment which is shown in the drawings, in which.

DETAILED DESCRIPTION

Figure 1:
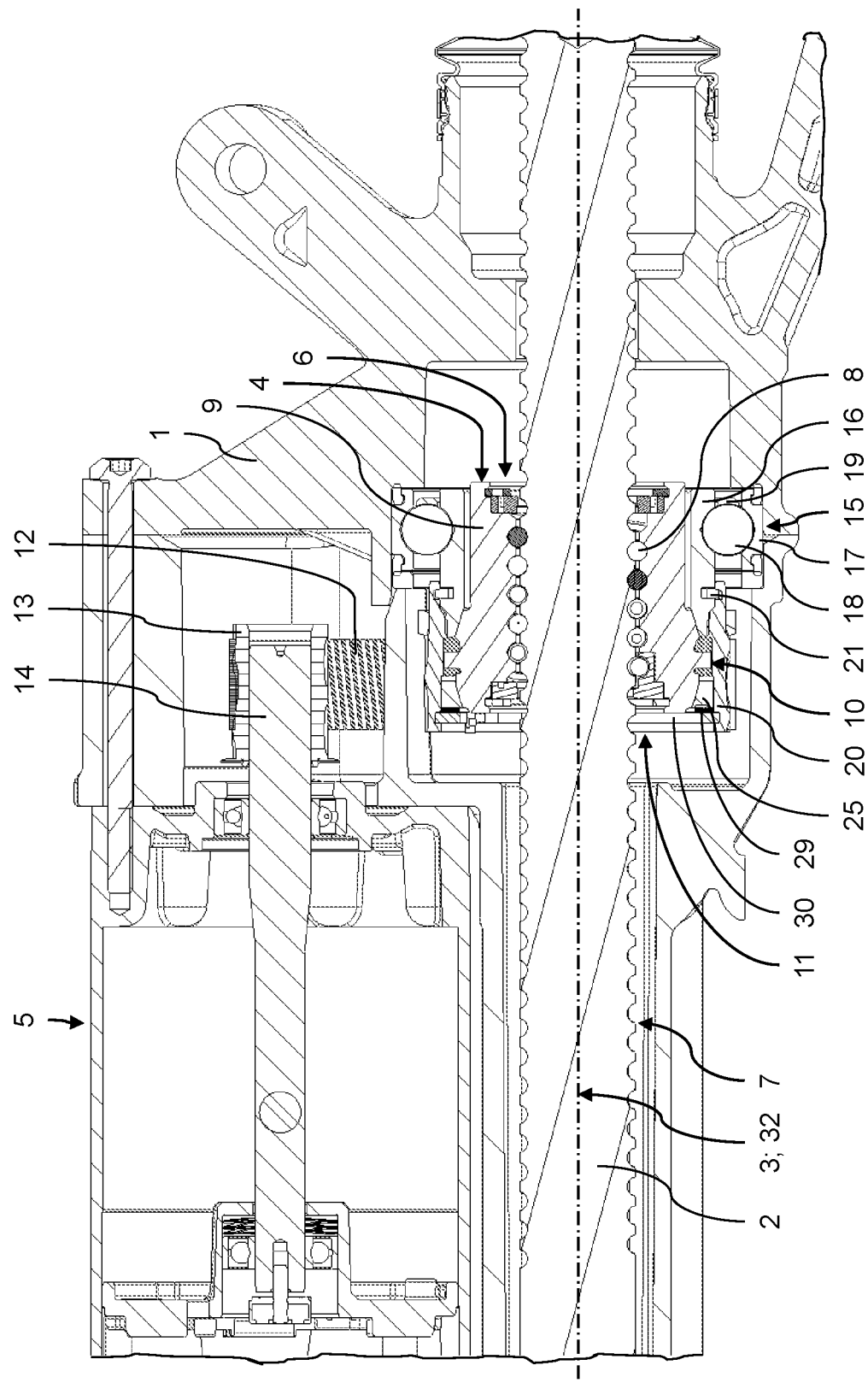
FIG. 1 shows a portion of a steering system according to the disclosure in a longitudinal section.

FIG. 1 shows a portion of a steering system according to the disclosure which is configured as a power steering system. The steering system comprises a multiple-piece, substantially tubular housing 1, within which a steering rod 2 is mounted such that it can be moved in a longitudinally axial manner, that is to say along its longitudinal axis 3. At its two ends, the steering rod 2 is connected in each case to a ball joint (not shown), said ball joints in turn serving for the connection to in each case one wheel steering arm (not shown). The wheel steering arms convert a longitudinally axial movement of the steering rod 2 into pivoting of steered wheels (not shown) of a motor vehicle.

A longitudinally axial movement of the steering rod 2 is brought about firstly by way of the generation of a rotational movement of a steering handle (not shown), in particular of a steering wheel, of the motor vehicle, said rotational movement of the steering handle being transmitted via a steering column (not shown) to a steering pinion (not shown). To this end, the steering pinion can interact with a toothing system (not shown) of the steering rod 2, in order to convert the rotational movement of the steering pinion into a translational movement of the steering rod 2 along its longitudinal axis 3.

Furthermore, a longitudinally axial movement of the steering rod 2 can be brought about by way of the generation of an auxiliary steering torque by means of a steering motor 5 which is of electric configuration in the present exemplary embodiment. To this end, the drive power of the steering motor 5 is transmitted, inter alia, by means of a ball screw drive 6 to the steering rod 2, to which end the steering rod 2 configures a recirculating ball thread 7 with a partially circular thread groove cross section in one section. A plurality of spherical transmission elements 8 are arranged within a section of the recirculating ball thread 7, which section is variable during steering, which transmission elements 8 are in addition received within the running grooves of a recirculating ball thread, which running grooves likewise have partially circular cross sections, which recirculating ball thread is configured on the inner side of the main body 9 of a transmission nut 4 of the ball screw drive 6. As a consequence of a corresponding mounting in a bearing arrangement, the transmission nut 4 of the ball screw drive 6 is integrated into the housing 1 such that it can be rotated but at the same time is substantially fixed or immovable with regard to its longitudinal axial directions.

A rotational drive of the transmission nut 4 takes place with the interposition of a further mechanism stage in the form of a flexible drive mechanism which is configured as a belt drive in the exemplary embodiment which is shown, to which end the transmission nut 4 is connected to a first mechanism wheel (pulley wheel) 11 fixedly for conjoint rotation or in a torque-transmitting manner. The first mechanism wheel 11 is wrapped around partially by a belt 12 (in the form of a toothed belt here), the belt 12 being guided, furthermore, over a second mechanism wheel 13 which is connected to an output shaft 14 of the steering motor 5 fixedly for conjoint rotation. As a consequence, a rotational movement of the output shaft 14 of the steering motor 5 is transmitted via the belt drive to the transmission nut 4 of the ball screw drive 6, a step-down transmission (transmission ratio i>1) of the rotational speeds taking place. Said rotational movement of the transmission nut 4 is then converted into a translational movement of the steering rod 2 by way of the interaction of said transmission nut 4 with the recirculating ball thread 7 which is configured in the outer side of the corresponding section of the steering rod 2.

Since, in the case of the conversion of a longitudinally axial movement of the steering rod 2 into a pivoting movement of the wheels of the motor vehicle, considerable transverse forces can act via the wheel steering arms on the ends of the steering rod 2, this results, in combination with the relatively great spacings between the ends of the steering rod 2 and that transmission nut 4 of the ball screw drive 6 which brings about a radial support of the steering rod 2, in a relatively great potential for a flexural deflection of the ends of the steering rod 2. A flexural deflection of this type can possibly be kept as small as possible by virtue of the fact that the steering rod 2 is additionally mounted and, as a result, is supported radially in the vicinity of the longitudinally axial ends of the housing 1. Nevertheless, a relevant oblique position or tilting of the steering rod 2 in the region of the transmission nut 4 of the ball screw drive 6 cannot always be avoided.

In order to ensure as low-friction an operation of the ball screw drive 6 as possible, even in the case of an oblique position of this type of the steering rod 2 in the region of the transmission nut 4, the transmission nut 4 should likewise be capable of being tilted into a corresponding oblique position. At the same time, the longitudinal forces and transverse forces which are applied to the steering rod 2 also have to be supported by means of the mounting of the transmission nut 4 within the housing 1. To this end, both the bearing arrangement should be mounted as far as possible without play in the longitudinally axial and also in the radial direction within the housing 1, and the transmission nut 4 also has to be received correspondingly without play within the bearing arrangement.

To this end, the bearing arrangement comprises a pivot bearing 15 in the form of a single-row four-point bearing (in accordance with DIN 628) which, in addition to an inner ring 16, also comprises an outer ring 17, furthermore a plurality of rolling bodies 18 in the form of balls which are arranged between said bearing rings 16, 17, and a rolling body cage 19. The outer ring 17 of the pivot bearing 15 is mounted directly in a bearing seat of the housing 1 and is fixed axially here. The inner ring 16 of the pivot bearing 15 protrudes with one of its axial end sections beyond the outer ring 17, and is connected by way of said end section to the first mechanism wheel 11 such that it cannot tilt. This tilt-resistant connection is realized by way of a securing ring 21 which engages into in each case one circumferential groove of the inner ring 16 of the pivot bearing 15 and of the main body 20 of the first mechanism wheel 11. In addition or as an alternative, however, a different type of positively locking and/or non-positive connection can also be provided, for example a screw connection, and/or an integrally joined connection, for example by means of welding or soldering.

Figure 2:
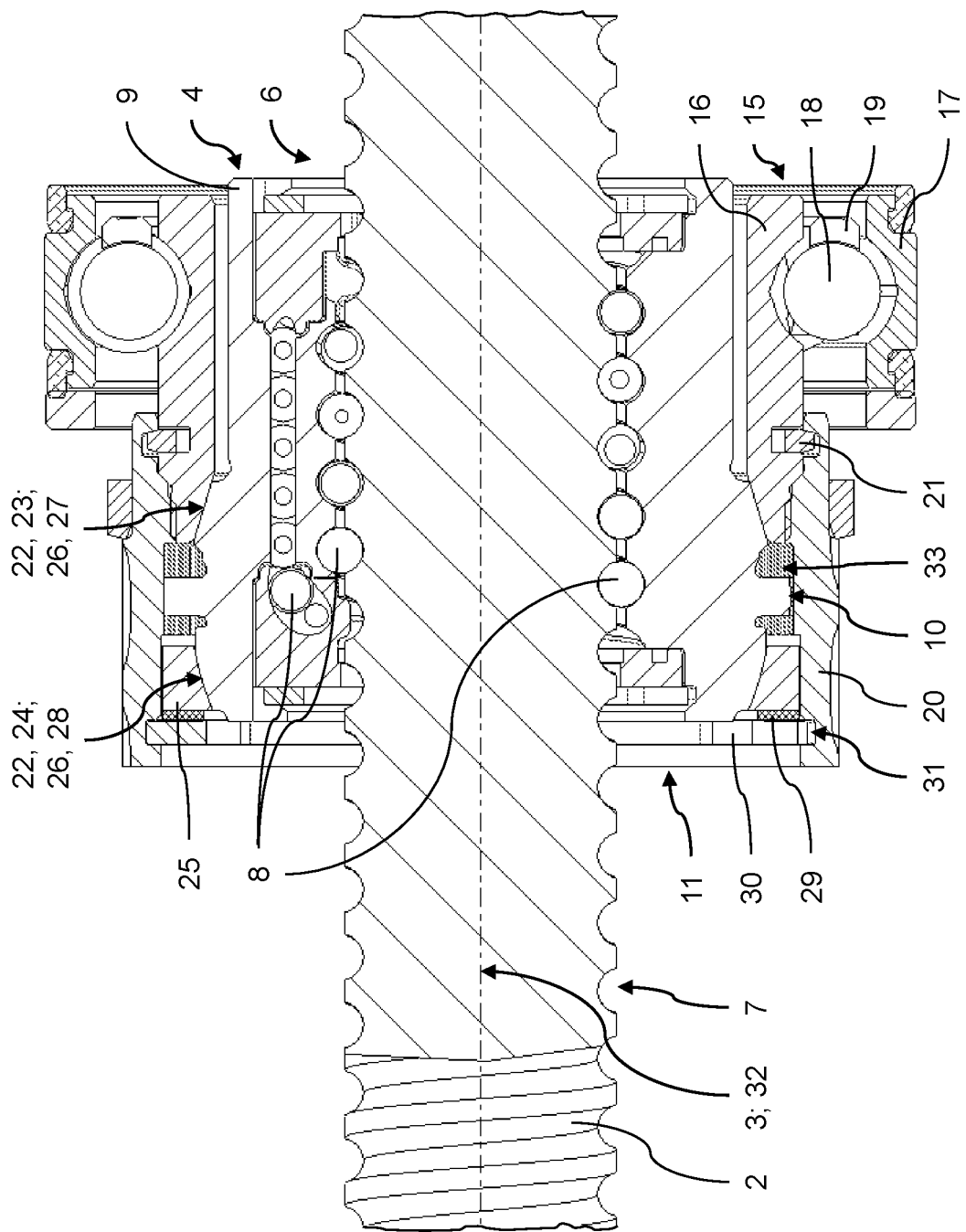
FIG. 2 shows the ball screw drive of the steering system according to FIG. 1.

Furthermore, the bearing arrangement comprises a pivoting bearing for the pivotable mounting of the transmission nut 4 and the first mechanism wheel 11 on one another. Said pivoting bearing is configured by the transmission nut 4 in interaction with the first mechanism wheel 11. To this end, the main body 20 of the first mechanism wheel 11 is configured as an internal gear, two part sections 23, 24 of a joint section 22 which runs in a partially spherically curved manner being arranged on the inner side of the main body 20 (cf. FIG. 2). Here, a first part section 23 of the joint section 22 of the first mechanism wheel 11 is configured by that end section of the inner ring 16 of the pivot bearing 15 which protrudes into the main body 20 of the first mechanism wheel 11, whereas a second joint section 24 is configured by a joint section component 25 of the first mechanism wheel 11 which is mounted in the main body 20 in an axially displaceable manner. The joint section 22 of the first mechanism wheel 11 makes contact with a correspondingly partially spherically curved joint section 26 of the transmission nut 4, said joint section 26 of the transmission nut 4 likewise having a first part section 27 and a second part section 28 which make contact with the corresponding part section 23, 24 of the joint section 22 of the first mechanism wheel 11.

The transmission nut 4 is arranged partially (specifically, with the joint section 26) within the first mechanism wheel 11 and partially with the configuration of a defined radial play within the pivot bearing 15 or the outer ring 17 of the pivot bearing 15, said radial play being of such great dimensions that, in the case of the pivoting angles of the transmission nut 4 which are to be expected during operation of the steering system, contact between said transmission nut 4 and the inner ring 16 of the pivot bearing 15 is avoided.

In order to realize a pivoting capability of the pivoting bearing with as little friction as possible, at least one of the joint sections 22, 26 is provided with a sliding coating, or a lubricant is arranged between the joint sections 22, 26. This type of friction minimization by means of a sliding coating or a lubricant has the advantage that no relevant settling occurs in the region of the pivoting joint over the service life of the steering system, as might be the case in the arrangement of a sliding layer which is configured as a separate component/separate components made from plastic, for example, between the joint sections 22, 26. In order to ensure freedom as far as possible of play of the pivoting joint even during the entire service life of the steering system, it is therefore sufficient to compensate for play which can be set on account of production-induced tolerances during the assembly and possibly also on account of minor wear during the use of the steering system. In order to ensure this, the joint section 22 of the first mechanism wheel 11 is loaded by means of an elastically prestressed tapered ring 30, with interposition of a spacer ring 29. Specifically, a prestressing force which is exerted by the tapered ring 30 on the joint section component 25 brings about a displacement of the joint section 25 in the direction of the first part section 23 of the joint section 22. A displacement of this type of the joint section component 25 is then limited by virtue of the fact that said joint section component 25 is pressed without play against the second part section 28 of the joint section 26 of the mechanism nut 4, as a result of which the first part section 27 of the joint section 26 of the transmission nut 4 then also bears without play against the first part section 23 of the joint section 22 of the first mechanism wheel 11.

The C-shaped tapered ring 30 is arranged in a circumferential groove 31 which is made in the inner side of the main body 20 of the first mechanism wheel 11. Furthermore, the tapered ring 30 comprises an end face which is oriented in a section obliquely with respect to the longitudinal axis 32 of the tapered ring 30 (or of the first mechanism wheel 11) and interacts with an adjoining bounding face of the circumferential groove 31 in such a way that radial, elastic widening of the prestressed tapered ring 30 would lead to a movement of the tapered ring 30 and therefore of the joint section component 25 in the direction of the first part section 23 of the joint section 22 of the first mechanism wheel 11. In order to ensure an axial loading of this type, it is provided that the diameter of the circumferential groove 31 is correspondingly selected to be greater than the external diameter of the tapered ring 30 in its mounted state.

For the transmission of a torque from the first mechanism wheel 11 to the transmission nut 4, a coupling is provided which is configured by an annularly circumferential internal toothing system 33 of the first mechanism wheel 11 and a likewise annularly circumferential external toothing system 10 of the transmission nut 4. Here, the internal toothing system 33 of the first mechanism wheel 11 and the external toothing system 10 of the transmission nut 4 are arranged in each case in a longitudinally axially central manner between the two part sections 23, 24:27, 28 of the associated joint section 22; 26. In addition, the teeth of said toothing systems 33, 10 are oriented in parallel with regard to the longitudinal axis 3 of the transmission nut 4 and of the first mechanism wheel 11. Furthermore, the tooth tips of the external toothing system 10 of the transmission nut 4 have a curved profile, in order to configure what is known as a curved tooth coupling which does not impede the pivoting of the transmission nut 4 relative to the first mechanism wheel 11 and the pivot bearing 15. Furthermore, it is provided that the internal toothing system 33 of the first mechanism wheel 11 and/or the external toothing system 10 of the transmission nut 4 are/is provided with a sliding coating, in particular the same sliding coating which can also be provided for the joint section or sections 22, 26, or a lubricant is arranged between said toothing systems 33, 10, in particular the same lubricant which can also be provided between the joint sections 22, 26. As a result, a pivoting movement capability of the pivoting joint with as low a friction as possible is once again ensured.

The invention claimed is:

1. A steering system comprising:
a steering rod mounted in a housing such that the steering rod is displaceable in a longitudinally axial manner, the steering rod having a recirculating ball thread;
a steering motor;
a ball screw drive via which the steering motor acts on the steering rod, the ball screw drive including a transmission nut that is driven by the steering motor and interacts via spherical transmission elements with the recirculating ball thread of the steering rod;
a pivot bearing that mounts the transmission nut such that the transmission nut is rotatable within the housing; and
a flexible drive mechanism having a mechanism wheel via which power of the steering motor is transmitted to the transmission nut, the mechanism wheel being fixedly attached to an inner ring of the pivot bearing such that the mechanism wheel cannot tilt,
wherein the transmission nut is mounted on the mechanism wheel such that the transmission nut is pivotable about a pivot axis oriented perpendicularly with respect to a longitudinal axis of the steering rod, the transmission nut having a first curved joint section that interacts with a second curved joint section defined at least partially by the mechanism wheel so as to provide a pivoting bearing about which the transmission nut is pivotable about the pivot axis,
wherein at least one of the first and second curved joint sections is provided with a sliding coating and/or a lubricant is arranged between the first and second curved joint sections.

2. The steering system according to claim 1, wherein the mechanism wheel is configured as a mechanism internal gear, and the first curved joint section of the transmission nut is arranged at least partially on an inner side of the mechanism wheel.

3. The steering system according to claim 1, wherein at least one of the first curved joint section and the second curved joint section is loaded elastically in such a way that a play-free contact is formed between the first and second joint sections.

4. The steering system according to claim 3, wherein one or both of the first curved joint section and the second curved joint section includes a first part section and a second part section, the second part section being axially displaceable relative to the first part section along a longitudinal axis of the mechanism wheel, and the second part section being loaded via a prestressed loading apparatus.

5. The steering system according to claim 4, wherein the loading apparatus comprises a spring element providing a spring force acting in a direction of the longitudinal axis of the mechanism wheel.

6. The steering system according to claim 5, wherein the spring element is configured as a tapered ring, a corrugated spring ring, or a cup spring.

7. The steering system according to claim 5, wherein the spring element is supported on a position securing element.

8. The steering system according to claim 1, wherein the mechanism wheel is connected in a torque-transmitting manner to the transmission nut via a coupling.

9. The steering system according to claim 8, wherein the coupling comprises a toothing system of the mechanism wheel and a toothing system of the transmission nut, which engage into one another.

10. The steering system according to claim 8, wherein:
    one or both of the first curved joint section and the second curved joint section includes a first part section and a second part section, and
    the coupling is arranged between the first part section and the second part section of the joint section.

11. The steering system according to claim 4, wherein the prestressed loading apparatus comprises a C-shaped tapered ring.

12. The steering system according to claim 11, wherein the C-shaped tapered ring is positioned in a groove having a diameter selected to be greater than an external diameter of the C-shaped tapered ring when the C-shaped tapered ring is positioned in the groove.

* * * * *